Patented Apr. 17, 1951

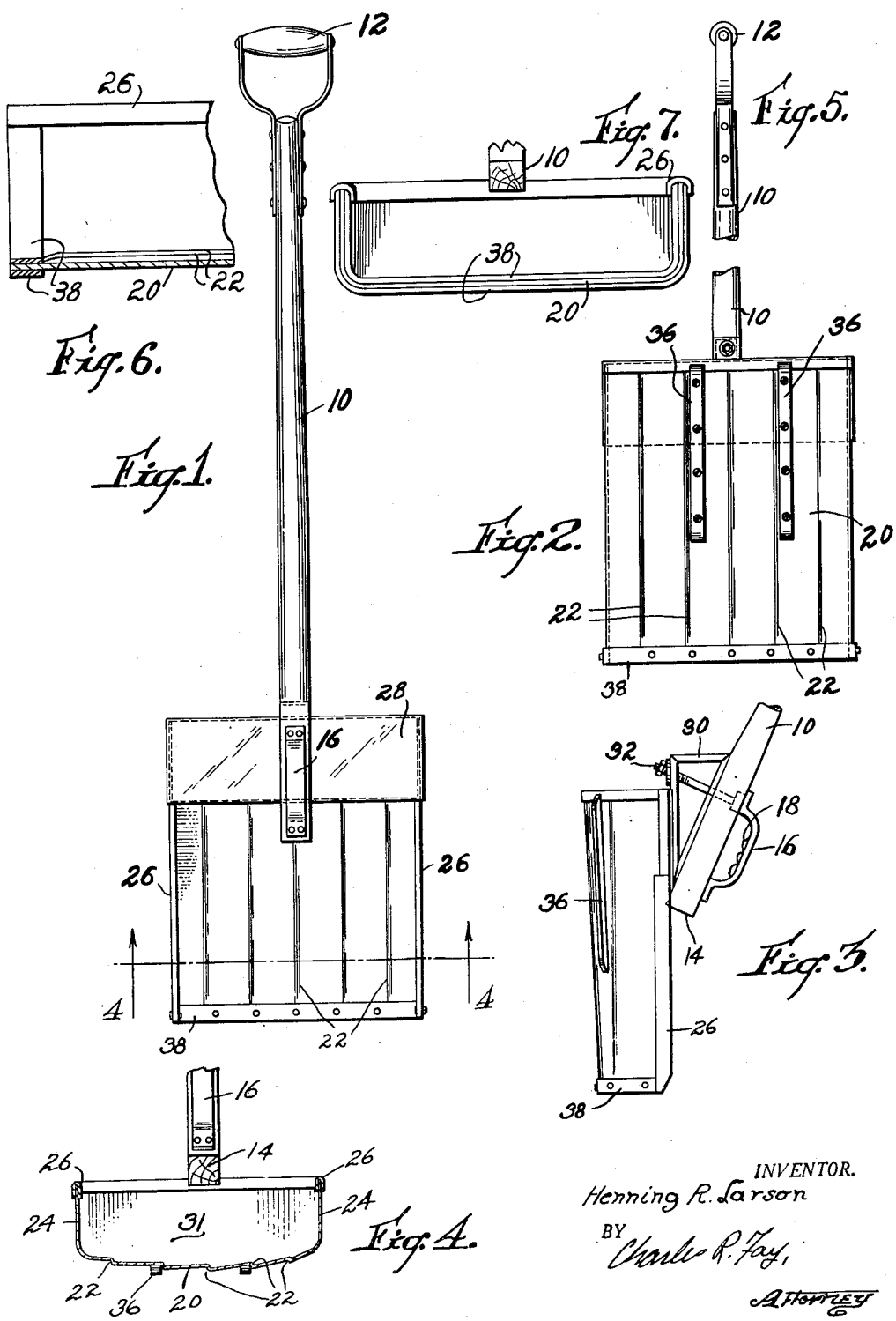

2,549,491

UNITED STATES PATENT OFFICE 2,549,491

SHOVEL

Henning R. Larson, Holden, Mass.

Application October 5, 1946, Serial No. 701,544

6 Claims. (Cl. 294—55)

This invention relates to new and improved constructions for shovels, particularly relating to snow shovels and for shovels for similar purposes, such as grain, etc.

Objects of the invention include the provision of a shovel of the class described, the main feature of which resides in a curved flexible blade or the like so that the shovel may be rested on a surface, and with a slight downward pressure, the blade or bottom of the shovel will conform to the surface to be shovelled.

Further objects of the invention are in the provision of a new and improved strong and rugged handle fastening and in the provision of sides and a covered rear end for the shovel blade.

Other objects and advantages of the invention will appear hereinafter.

Reference is to be had to the accompanying drawings in which

Fig. 1 is a view in elevation;

Fig. 2 is a view similar to Fig. 1 but showing the rear or under part of the shovel with the handle broken away;

Fig. 3 is a view in side elevation of Fig. 2;

Fig. 4 is a section on line 4—4 of Fig. 1;

Fig. 5 is a partial view of the handle;

Fig. 6 is a section taken longitudinally through the forward part of the shovel; and Fig. 7 is a section taken along a longitudinal center line of the edge members at the forward end of the shovel.

As shown in the drawings the new shovel is provided with a handle shaft 10 to which is secured by any desired means a hand hold 12. The handle terminates at a point 14, see Fig. 3, and is provided with a hand hold 16 adjacent the end 14, the hand hold 16 being provided with finger grip portions 18 providing against any slipping of the hand during the shoveling operations.

The shovel itself comprises a blade or bottom 20 which is corrugated as shown at 22, see particularly Fig. 4. This construction provides for a strong bottom which, at the same time, is flexible and is made on a slight curve as shown in Fig. 4 for added strength. At the sides of the shovel the same extend upwardly as at 24 and the free edges are provided with a U-shaped bead 26. A plate 28 extends across the blade of the shovel from side to side at the rear thereof forming a support for a triangular bracket 30 riveted, welded, or otherwise secured to the plate 28. A rear plate 31 joins the plate 28 to sides 24. Handle shaft 10 may be secured to bracket 30 by a bolt and nut 32.

The blade 20 of the shovel is provided with a pair of skids 36 to aid in the shoveling operations and these may be riveted, welded, or otherwise secured to the bottom of the shovel. The front end of the blade is covered by a pair of straps 38 at both sides thereof so as to provide a straight and non-corrugated scraping and shoveling edge. Straps 38 are also flexible.

This invention will be seen to provide an extremely efficient and rugged shovel of the class described, which has a flexible bottom so that the same may conform to the surface to be shoveled thus allowing an efficient and clean job of shoveling to be done. It is pointed out that the shovel is also useful for loading grain and any other material desired or convenient.

Having thus described my invention and the advantages thereof, I do not wish to be limited to the details herein disclosed otherwise than is set forth in the claims but what I claim is:

1. An article of manufacture comprising a shovel blade formed on an arc, a handle therefor secured thereto, said arc presenting a curved shoveling edge, and said blade being flexible to cause said edge to conform to a surface to be shovelled upon the exertion of downward pressure thereon.

2. An article of manufacture comprising a shovel having a flexible blade and upstanding side walls, a plate connecting the side walls, and a handle shaft secured to the plate at an angle thereto, the flexible blade being on an arc the radius of which lies in a plane normal to the blade.

3. An article of manufacture comprising a shovel having a downwardly curved flexible blade and opposite upstanding side walls, a plate connecting the latter, a handle shaft secured to the plate, and hand grips on the shaft at each end thereof, said hand grips being located at right angles to each other.

4. A shovel comprising a corrugated flexible slightly curved blade, side walls on the blade, a plate connecting the side walls, a handle shaft on the plate, and an open triangular bracket securing the handle shaft to the plate at an angle thereto, the bracket being parallel to the side walls and located midway thereof and having a long side secured to the handle.

5. A shovel comprising a curved flexible corrugated blade, a metal strap at each side of the blade at the edge thereof and parallel thereto, said straps forming the working edge of the shovel and flexing therewith, the corrugations of the blade lying at right angles to the straps.

6. A shovel comprising a corrugated flexible blade having a leading working edge formed on a curve lying in a plane normal to the blade.

HENNING R. LARSON.

REFERENCES CITED

The following references are of record in the file of this patent:

UNITED STATES PATENTS

| Number | Name | Date |
|---|---|---|
| 61,784 | Wheat | Feb. 5, 1867 |
| 1,264,433 | Posten | Apr. 30, 1918 |
| 1,517,341 | Bulger | Dec. 2, 1924 |
| 2,085,382 | Nebor | June 29, 1937 |
| 2,122,948 | Padelford et al. | July 5, 1938 |
| 2,299,418 | Thomas | Oct. 20, 1942 |
| 2,357,114 | Howe | Aug. 29, 1944 |

FOREIGN PATENTS

| Number | Country | Date |
|---|---|---|
| 12,146 | Great Britain | May 25, 1907 |
| 135,100 | Great Britain | Nov. 20, 1919 |